June 27, 1972  H. A. DALIK  3,672,804
PIPE BELLING MACHINE

Filed Oct. 12, 1970  8 Sheets-Sheet 4

INVENTOR.
HERBERT A. DALIK

BY
Curtis, Morris & Safford
ATTORNEYS

June 27, 1972 H. A. DALIK 3,672,804
PIPE BELLING MACHINE
Filed Oct. 12, 1970 8 Sheets-Sheet 7

FIG. 8

INVENTOR.
HERBERT A. DALIK
BY
Curtis, Morris & Safford
ATTORNEYS

FIG. 9

United States Patent Office 3,672,804
Patented June 27, 1972

3,672,804
PIPE BELLING MACHINE
Herbert A. Dalik, Pemona, N.Y., assignor to The
Flintkote Company, White Plains, N.Y.
Filed Oct. 12, 1970, Ser. No. 79,842
Int. Cl. B29c 17/00
U.S. Cl. 425—328      17 Claims

ABSTRACT OF THE DISCLOSURE

An apparatus for simultaneously belling the single wall thickened end portion of individual pipes supplied to the apparatus from an extruder with the thickened wall end portions thereof located at opposite ends of the successive pipes has a pick-up station for receiving the pipes from the extruder and a generally vertically extending conveyor which sequentially receives the pipes at the pick-up station and transports the pipes through a plurality of process stations including a pair of generally vertically spaced first process stations at which the both ends of the pipes are cleaned by a flow of air produced therein which is directed outwardly toward the pipe ends to remove debris therein while a line is simultaneously scribed on the peripheral surface of the spigot portion of the pipes at a predetermined position from the end thereof, a pair of generally vertically spaced second process stations at which the wall thickened end portions of the respective pipes are heated, and a pair of generally vertically spaced third process stations at which the heated wall thickened end portions of the respective pipes are belled prior to discharge from the apparatus.

---

This invention relates to the production of belled pipes or tubes, and in particular, to an apparatus for the automatic and continuous belling of selected ends of extruded pipes in an automatic process.

It has previously been proposed to bell the ends of extruded pipe by an operation which is almost completely manually controlled. The necessity of belling the ends is due to the fact that, as a rule, one end of the tube or pipe must be widened in order to receive an end of an adjacent pipe to form a continuous pipeline. Typically, the pipe is widened out from its extruded diameter to an increased diameter in the shape of a socket for the adjacent tube, and an annular corrugation is formed in the widened portion to accommodate sealing rings to prevent leakage at the joint.

The extruded pipes are generally provided with a thickened wall portion adjacent the end to be belled since that end must be stretched during the belling operation and thus, loses some of its thickness. Since the belled portion is subjected to the same pressure as the unwidened portion of the tube, its thickness must be the same as the remainder of the tube in order to withstand these pressures.

One method of forming a thickened end wall portion of the tubes is described in Pat. No. 3,264,383 to Niessner et al., the disclosure of which is incorporated herein by reference. As disclosed therein, an interior wall portion of the pipe is thickened by varying the draw-off speed from the extruder at predetermined distances. The pipes are then cut at the wall thickened section to form the wall thickened end portions of two adjacent pipes. It is thus seen that as the individual pipes are withdrawn from the extruder, the wall thickened ends of successive pipes are located at opposite ends of the pipes themselves. Thus, if the wall thickened end portion of the first pipe out of the extruder is at the rear end of the pipe, the wall thickened end portion of the next pipe out of the extruder will be at the forward end of that pipe.

The previously proposed manual pipe belling systems take the extruded wall thickened pipe from the extruder and discharge alternate pipes on either side of the extruder line onto transportation carts. These carts are then moved to a belling station at which an operator manually moves an individual pipe to a feed rail and cleans the interior of each of the pipe ends with an air hose connected to a compressed air source, which hose produces an air blast to loosen saw cutting chips from the inside of each of the pipe ends. The operator, thereafter, marks on each pipe with a stenciling brush or scribe a circumferential strip at a measured distance from the unthickened or spigot end of the pipe. This strip indicates the permissible depth of insertion of the spigot pipe end into the belled end when the pipeline is completed, in order to guide the construction workers in properly aligning and seating the pipes in sealing relation.

The pipes, after being cleaned and scribed, are moved to a heating station wherein the wall thickened ends of a plurality of the pipes are heated to soften the material of which the pipes are generally made. Typically, such material constitutes a synthetic plastic such as polyvinylchloride or polyethylene. After the pipe ends are properly heated, the operator moves the individual pipes to a pipe belling station wherein he manually aligns the soft pipe with a belling mandrel, such as for example the mandrel utilized in the belling apparatus described in Pat. No. 3,205,535 to Niessner et al., the disclosure of which is also incorporated herein by reference. After the pipe end is properly seated on the belling mandrel, the operator pushes the necessary control buttons to activate the belling apparatus and the belling operation is thence performed automatically, as fully described in the last mentioned Niessner et al. patent.

After the belling operation is completed, the operator transfers the belled pipe onto a discharge rail and repeats the belling operation with the next pipe withdrawn from the heater. The process is repeated until a predetermined number of pipes have been belled and stored on a discharge rail or support. The operator must then stop the belling operation and load the belled pipes onto a pipe unit strapping cart. It is desirable in these carts that the pipes be laid adjacent each other with the belled end of one pipe adjacent the spigot end of the next. To do this, every second pipe discharged from the belling apparatus must be lifted over the operator's head and turned 180° end for end to orient the belled pipe for proper unitizing on a cart.

It is thus seen that the prior manual process is dangerous and requires the full time heavy labor of at least one workman to guide and handle the pipes during the various operations. For pipes of a diameter larger than 4 inches and longer than 20 feet at least two operators are needed to handle the numerous movements of the pipe between the various operations. Further, the belling process must stop during all periods when the operator must leave his post and the typical belling operation output is 20 percent less than the output of the extrusion line. As a result, excess unbelled pipe is produced, and this pipe must be stored for later belling when belling equipment and operators are available.

Accordingly, it is an object of the present invention to provide an automatic pipe belling apparatus.

It is a further object of the invention to provide apparatus to automatically bell selected pipe ends in a continuous process at substantially the same rate at which pipe is supplied from an extruder.

It is still another object of the present invention to provide an apparatus for the automatic and continuous belling of pipes which apparatus is both simple in operation and inexpensive in construction.

In accordance with an aspect of the present invention, a pipe belling apparatus is provided for simultaneously belling the single wall thickened end portion of successive pipes supplied to the apparatus from an extruder. The pipes, as mentioned above, are typically supplied from the extruder in succession with the wall thickened end portions thereof located at opposite ends of the respective pipes. The pipes are supplied directly from the extruder so that the wall thickened end portions of succeeding pipes are located at opposite ends of the apparatus and the latter has the required processing equipment at a plurality of stations, at each side thereof to properly perform the belling operation. The apparatus includes a generally vertically extending conveyor which is adapted to sequentially receive the pipes at a pick-up station and carry the pipes in a generally horizontal position upwardly between a plurality of processing stations.

The conveyor has a plurality of extensions which are adapted to receive and transport individual pipes from the pick-up station. A pipe stop system is provided adjacent the conveyor and discharge station which prevents movement of a pipe from the extruder down a tilted trough to the pick-up station until a conveyor extension is located at the station. Every two successive pipes picked up by the conveyor, i.e. each pair of successive pipes having the wall thickened end portions thereof at opposite sides of the apparatus, are moved from the pick-up station to a pair of vertically spaced first processing stations, each of which is provided with reciprocating nozzle members for producing a flow of air within the pipes which flow is directed outwardly of the ends of the pipes to clean cuttings and debris therein. In addition, each of the first processing stations includes apparatus for scribing a line at a predetermined distance from the spigot or unthickened end portion of the pipe. After the cleaning and scribing operations, the pair of pipes is transported from the first station to a pair of second stations, while simultaneously successive pipes are supplied to the conveyor for movement to the first stations. At each of the second stations a clamping means is provided for moving the pipes laterally of the conveyor and into a pipe heating apparatus wherein the wall thickened end portions of each of the pipes are heated in preparation for the belling operation. When sufficiently heated, the clamping devices return the pipes to their previous positions and the conveyor moves the pair of pipes from the second stations to a pair of generally vertically spaced third stations. Simultaneously, additional pipes are fed to the conveyor for transportation to the first stations and the pipes previously occupying the first stations are transported to the second stations, wherein the heating operation is repeated thereon. At the third station, the pipes are engaged by a second clamping system and the heated wall thickened end portions thereof are moved onto a pipe belling apparatus of the character described in the Niessner et al. patents. After the belling operation is completed, the still heated belled end portion is cooled by a spray of water and the pipe end is withdrawn from the belling mandrel. The conveyor, thereafter, moves the pipes from the third stations to a point of discharge from the apparatus, wherein the pipes are supplied to a unitizing cart with the spigot and belled ends of the successive pipes are in the desired adjacent relationship.

The above and other objects, features and advantages of the invention will be apparent in the following detailed description of an illustrative embodiment thereof, which is to be read in the accompanying drawings wherein:

FIG. 2 is an end view taken on line 2—2 of FIG. 1a;

FIG. 3 is a plan view partly in section taken on line 3—3 of FIG. 1a;

FIG. 6 is a plan view taken on line 6—6 of FIG. 1b;

FIG. 7 is an enlarged side view, taken on line 7—7 of FIG. 1a, of the clamping apparatus used at the heating and belling stations, and illustrating the two extreme positions of the clamping jaws;

Figure 1A:
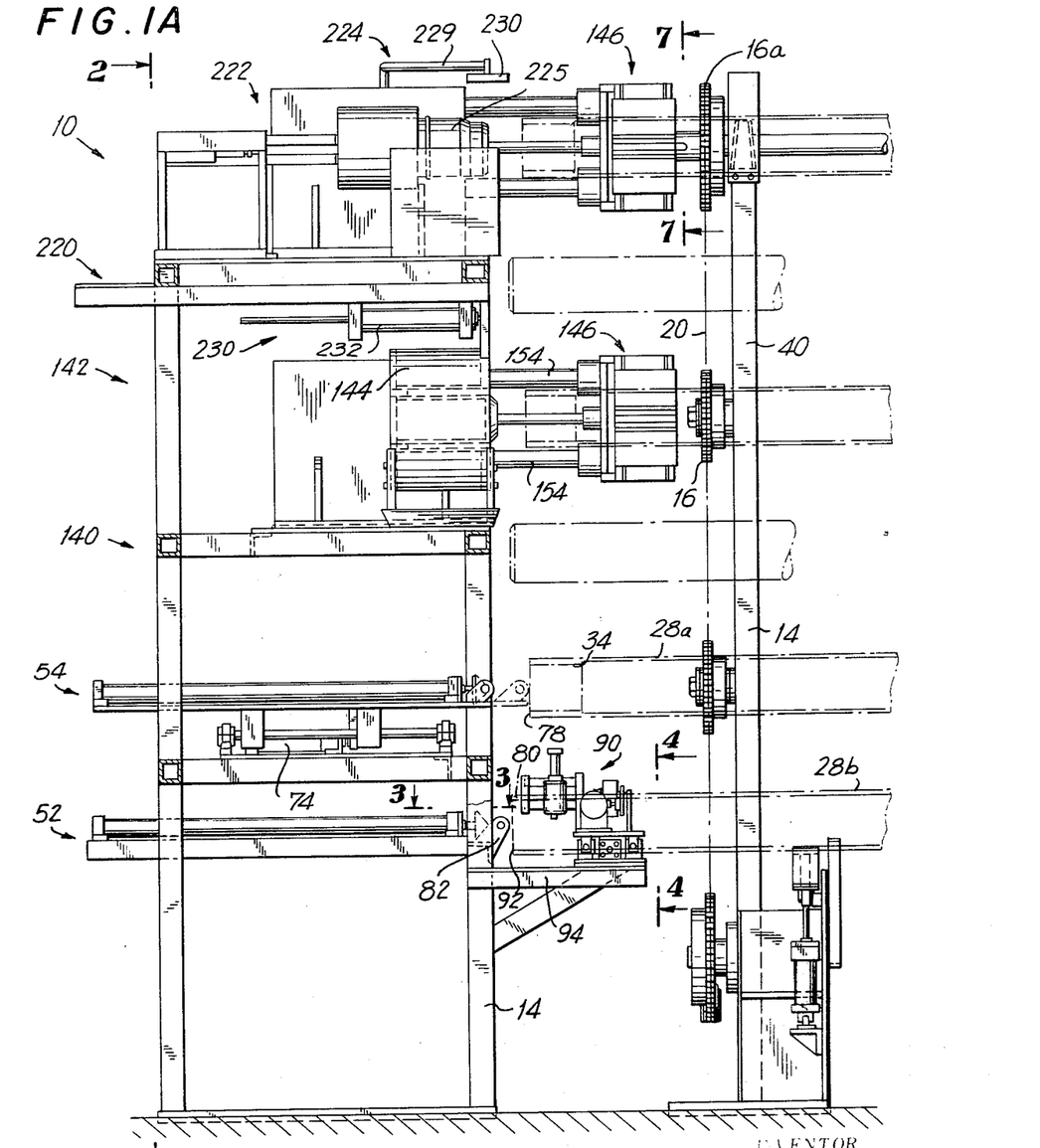
FIGS. 1a and 1b constitute an elevational view of an apparatus constructed in accordance with one embodiment of the present invention.
Figure 1B:
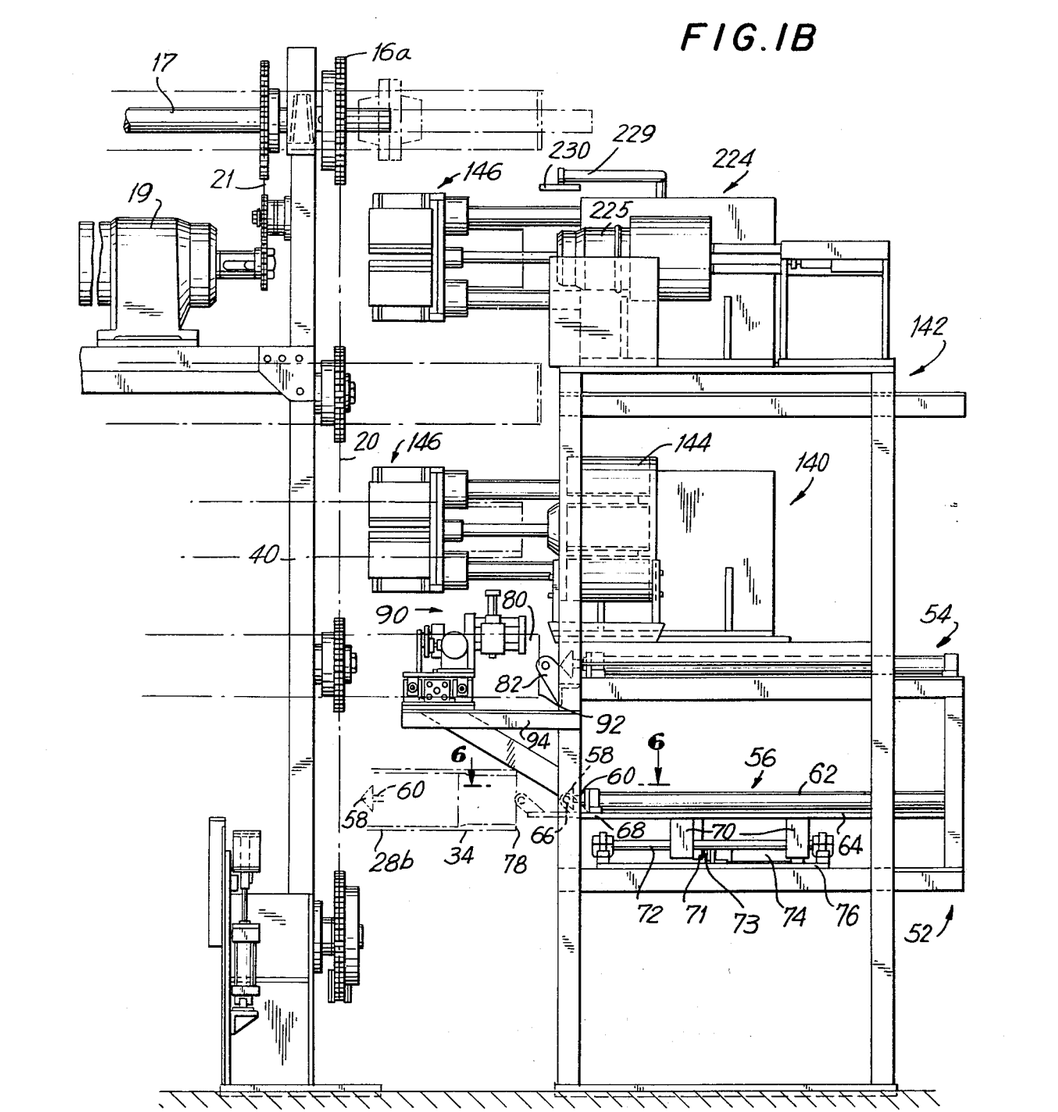
Figure 2:
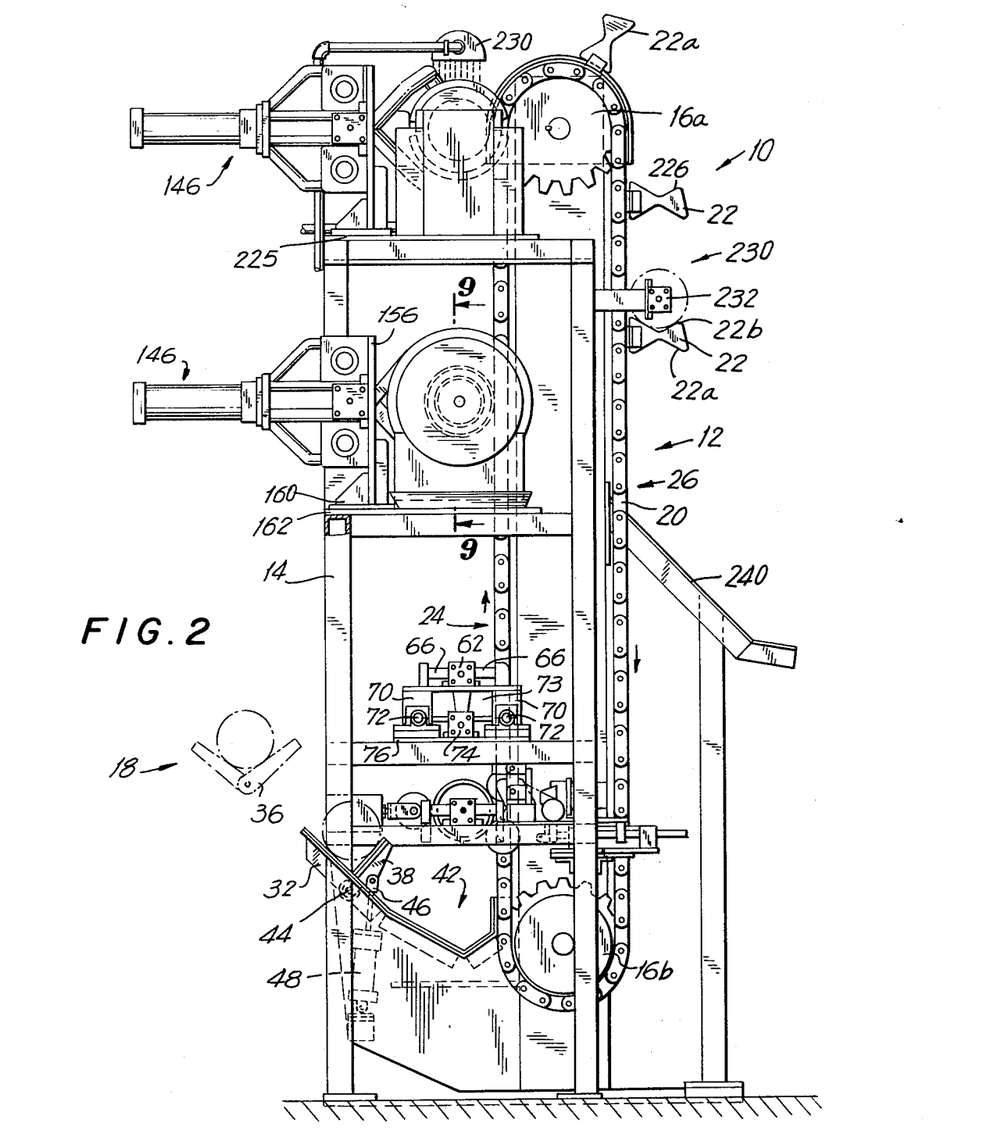

Referring now to the drawings in detail, initially the FIGS. 1 and 2 thereof, it is seen that a pipe belling apparatus 10 constructed in accordance with the present invention includes a generally vertically extending conveyor 12 mounted for movement on an upright frame 15 by a plurality of sprockets 16, to transport the pipes, delivered from a trough 18, through a plurality of processing stations. The uppermost sprockets 16a are affixed to longitudinally extending drive shaft 17 to which motive power is supplied by motor 19 through chain and sprocket drive train 21 to affect movement of conveyor 12. The latter consists of a plurality of endless chains 20 extending over idler sprockets 16 and driven sprockets 16a, and each of the chains has generally butterfly shaped extensions 22 secured thereto at evenly spaced intervals. The shape of extensions 22 provides proper support for pipes transported by the conveyor along either the upward flight 24 or the downwardly directed flight 26 thereof.

Pipes 28 are supplied to trough 18 from an extruder (not shown) such as for example the extruder described in Pat. No. 3,264,383, and successive pipes are supplied, as mentioned above, with the wall thickened end portion 34 thereof at opposite ends of successive pipes. Thus, for example, referring to FIGS. 1a and 1b, if the first pipe 28a supplied from the extruder has wall thickened end portion 34 at the rearward end thereof, thereby being presented to the left hand portion of apparatus 10, then the next pipe 28b supplied to the apparatus will have its wall thickened end portion 34 at the right hand side of the apparatus in FIG. 1b. The pipes are sequentially supplied in this manner to apparatus 10 along trough 18, and when an individual pipe is properly positioned in the trough adjacent apparatus 10, the innermost wall portion 36 thereof is tilted, to permit pipe 28 to slide down onto charging rail 32 of apparatus 10.

It is noted that FIGS. 1a and 1b show the left and right ends of the apparatus, respectively. The intermediate portions of the apparatus (not shown for the sake of clarity), merely provides additional vertical support members similar to the frame members 40 of frame 14, which frame members mount corresponding pulleys 16 for guiding additional conveyor chains therealong. These additional chains also include extensions 22 for supporting the pipe for movement between the various stations of the apparatus.

Charging rail 32, is, as seen in FIG. 2, adapted to guide pipes 28 to a pick-up station 42 adjacent lowermost sprocket 16b. However, movement of individual pipe members along rail 32 is selectively prevented by a pivotally mounted stop arm 38 which is in its raised position when a pipe is fed to rail 32 from trough 18. Arm 38 holds pipe 28 until apparatus 10 is ready for another pipe and simultaneously frees trough 18 of its pipe so that the trough may accept another pipe from the extruder.

At the beginning of the pipe belling operation arm 38 is retracted and a set of extension members 22 are positioned at pickup station 42. The first pipe supplied from trough 18 rolls down guide roll 32 and after it comes to rest on extensions 22 conveyor 12 is operated to move the pipe upwardly in the apparatus. As soon as that pipe clears station 42, arm 38, which is pivotally mounted on frame 14 by pivot pin 44, is raised, by the actuation of hydraulic ram 48 to prevent the next pipe supplied from trough 18 from sliding down rails 32. Ram 48 is secured to frame 14 at one end thereof and includes piston rod 46 pivotally connected to arm 38 for controlling motion of the latter. As the next set of extensions 22 on conveyor 12 approaches station 42, arm 38 is lowered by ram 48 to permit the next pipe to roll down rails 32 to station 42 where it is picked up by conveyor 12 as the latter is moved through that station. It is noted that the sequential operations of moving conveyor 12, operating ram 48 and trough 18, and the other sequential operations described below are all controlled automatically by an electronic control system that forms no part of this invention and which may be readily produced by one skilled in the art after reviewing the sequential operation of the device.

Conveyor 12 is adapted to move pipes 28 through a plurality of pairs of processing stations positioned adjacent the upward flight 24 thereof. The first pair of stations to which pipes are presented by the conveyor 12 are cleaning and scribing stations 52 and 54. These stations are identical in construction and operation with the exception that the components thereof are positioned in opposite relation in opposite portions of frame structure 14 to perform the necessary operations on the opposed wall thickened end portions and spigots of the pipes.

The first pipe, e.g. pipe 28a, presented to pickup station 42 is moved by conveyor 12 towards station 52 and as that pipe approaches station 52, a second set of extensions approaches station 42. While this occurs, arm 38 is pivoted clockwise about pivot 44, as seen in FIG. 2, to permit the next pipe 28b to roll down rails 32. Conveyor 12 is kept moving however and pipe 28b is engaged by extensions 22 "on the fly," that is, as extensions 22 move through station 42. Arm 38 is held in its retracted position after pipe 28b moves to station 42 and conveyor 12 continues in operation until pipe 28a is brought to station 54 and pipes 28b is brought to station 52. At this point conveyor 12 is stopped and the pipes are positioned for the initial operations in preparation for belling. At the same time, yet another set of extensions 22 is presented at station 42 for receipt of the first pipe 28a of the next pair of pipes 28a and 28b.

As mentioned, stations 52 and 54 are identical, and accordingly like numerals have been utilized in the drawings to indicate identical components, and only the components illustrated at station 52 are described herein in detail. For the described embodiment of the present invention, pipes 28 have been illustrated in FIGS. 1a and 1b with the wall thickened end portions 34 of the first pipe 28a positioned at the left of the apparatus whereas the wall thickened end portion 34 of the second pipe 28b at the right. Thus, the components required to perform the necessary operations at stations 52 and 54 are positioned with relation to the wall thickened end portions and, of course, if the pipes were supplied from an extruder in opposite relation, the components in the apparatus would similarly be reversed.

At stations 52 and 54, apparatus is provided for cleaning out the interior end portions of the pipe and scribing a line on the periphery of the pipe at a predetermined distance from the spigot end thereof. This scribed line is intended to give an indication to the installers of the pipe in the field of the permissible depth of insertion of the spigot into the belled portion of the pipe.

Cleaning apparatus 56 is provided at the right end of station 52 as seen in FIG. 1b, and includes an air nozzle 58 mounted on the end of a hollow tube 60 which is connected to a source of compressed air (not shown) and enclosed in a pneumatic cylinder 62 which is adapted to reciprocate tube 60 and nozzle 58 into and out of the end 34 of pipe 28b a predetermined distance, as for example, between the positions indicated by dotted lines in the drawing. Ram 62 is mounted on plate 64 which carries a pair of stop members 66 at forward end 68 thereof. As seen more clearly in FIG. 6, stop members 66 are generally cylindrical rollers mounted at either side of plate 64 by arms 65 in spaced location to permit passage of nozzle 58 and rod 60 therebetween. Plate 64 is mounted for reciprocation towards and away from pipe 28b by means of two sets of depending support arms 70 which are slidably mounted on guide rods 72. Plate 71, integral with and depending from plate 64, is positioned between rods 72 and secured to the piston rod 73 of hydraulic ram 74 which affects the reciprocation of plate 64. Ram 74 is rigidly connected to support platform 76, which platform not only supports ram 74, but also supports guide rods 72 and thus cleaning system 56.

Figures 3, 6, 7:
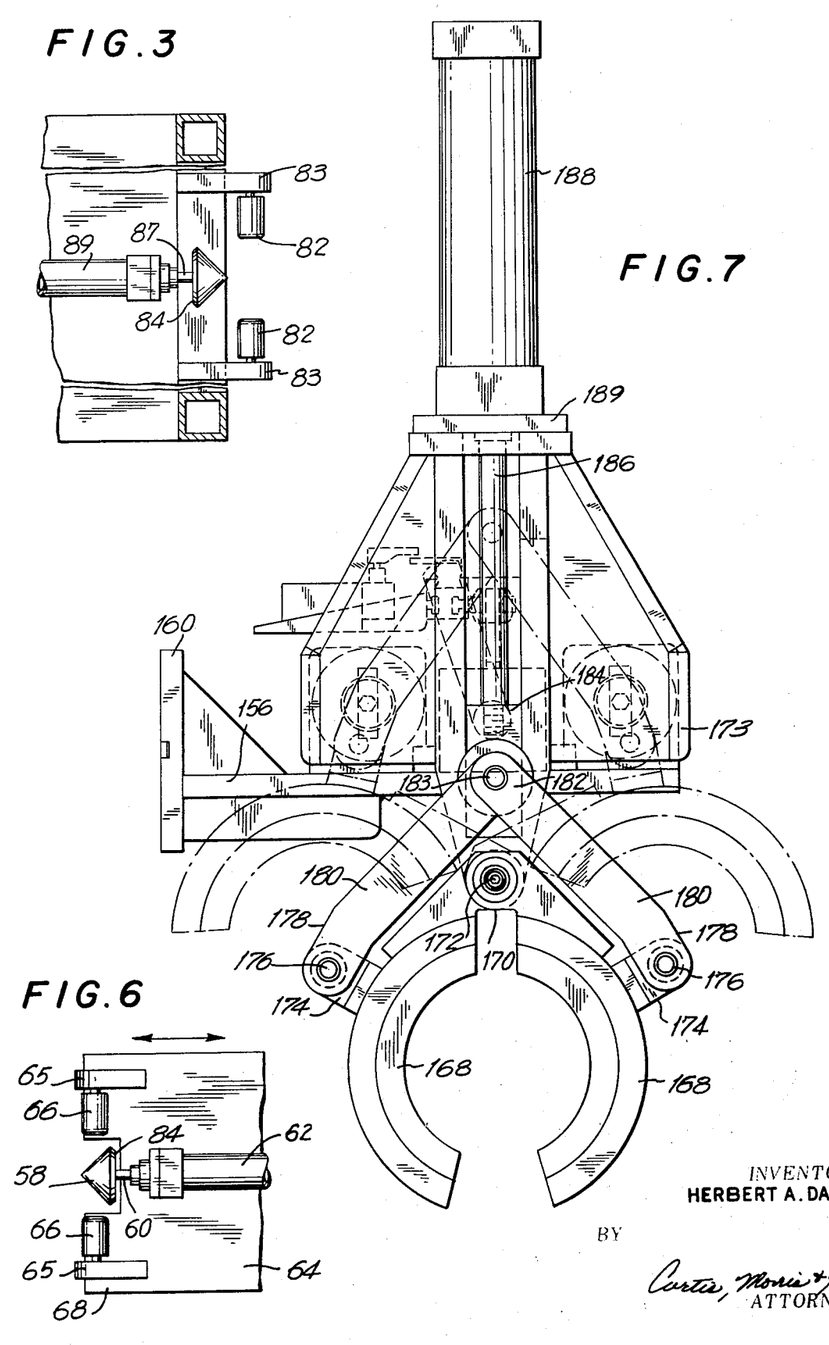

When pipes 28 are positioned at cleaning stations 52 and 54, conveyor 12 is stopped and each of the rams 74 are operated to move the respective plates 64 and stops 66 into engagement with the edge 78 of wall thickened portion 34. Ram 74 and plate 64 are moved after engagement of stop members 66 with edge 78 to move pipes 28 laterally with respect to conveyor 12 and in a generally perpendicular direction to the path of travel thereof, so that the pipes 28b and 28a at stations 52 and 54 respectively are moved into a laterally offset relation, as is indicated in the drawing. This lateral movement of the pipes 28 causes the edge of spigot ends 80 thereof to engage stop members 82 secured to frame structure 14. As seen in FIG. 3, stop members 82 constitute generally cylindrical rollers mounted on arms 83 secured to frame 14. Arms 83 and stop members 82 are spaced laterally apart to permit passage of air nozzles 84. The latter corresponds substantially to nozzle 58 and is operably connected to a source of compressed air through rod 87 for cleaning out spigot end 80 of pipe 28. Rod 87 is operatively connected to a ram 89 which is adapted to reciprocate the rod and nozzle 85 into and out of pipe 28.

When pipes 28 are engaged with stop members 82 they are held in a laterally offset position and further movement thereof is prevented; thereafter, nozzles 58 and 85 are simultaneously inserted within pipe ends 34 and 80 by rams 62 and 89. Nozzles 58 and 84 are generally hollow members which include a plurality of apertures in their rearwardly facing wall portion 84. After insertion of the nozzles within the ends of the pipes, a blast of air is provided from the source of compressed air (not shown) which blast was directed outwardly of the ends of the pipe through the apertures in wall portion 84, to clean debris and cuttings that may be present in the pipe ends as a result of the extruding and cutting operations. Simultaneously, the nozzles are withdrawn from the pipe ends while the blast of air is continuously supplied thereto in order to insure proper scouring and cleaning of the interior of the pipe.

Figure 4:
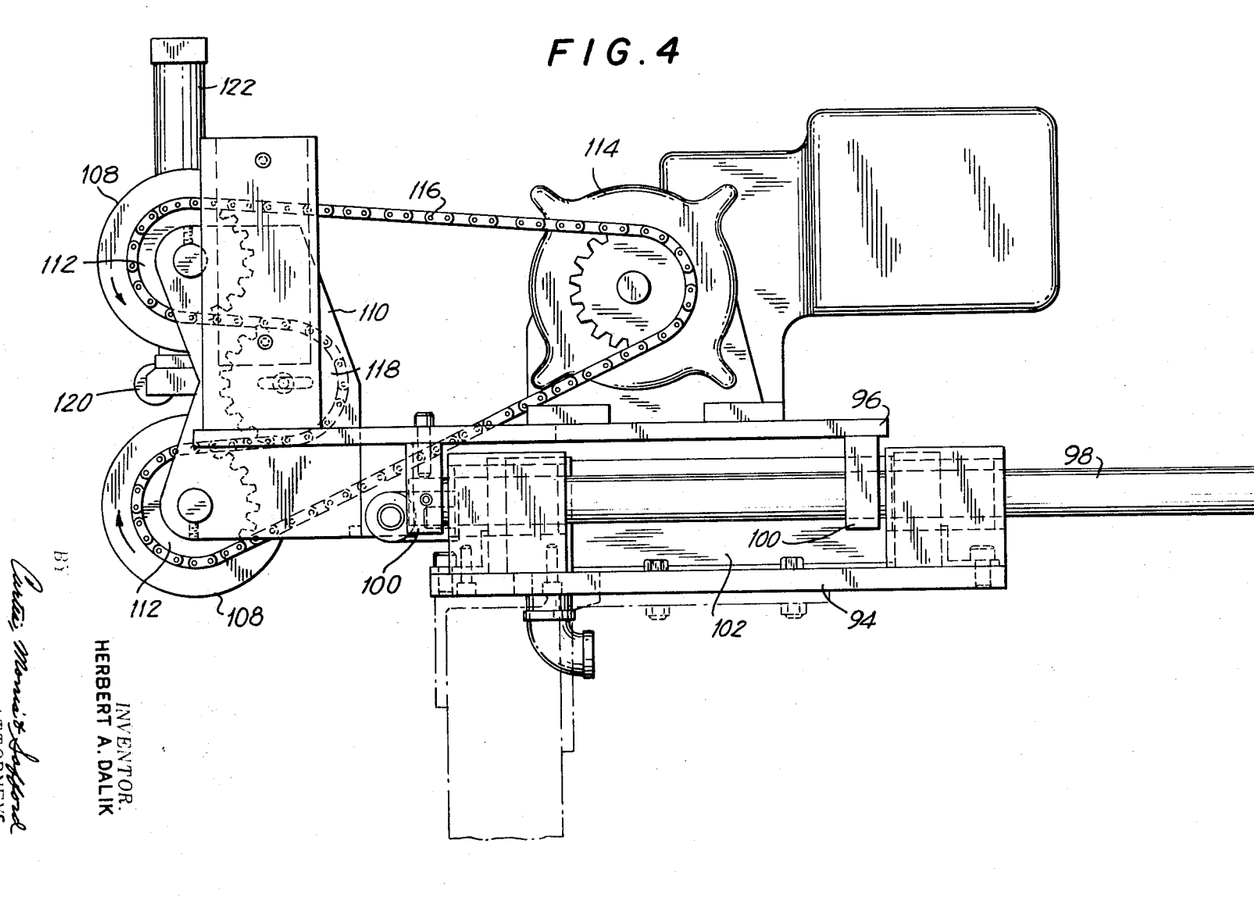
FIG. 4 is a view taken on line 4—4 of FIG. 1a of the apparatus for scribing the spigot end of the pipe.
Figure 5:
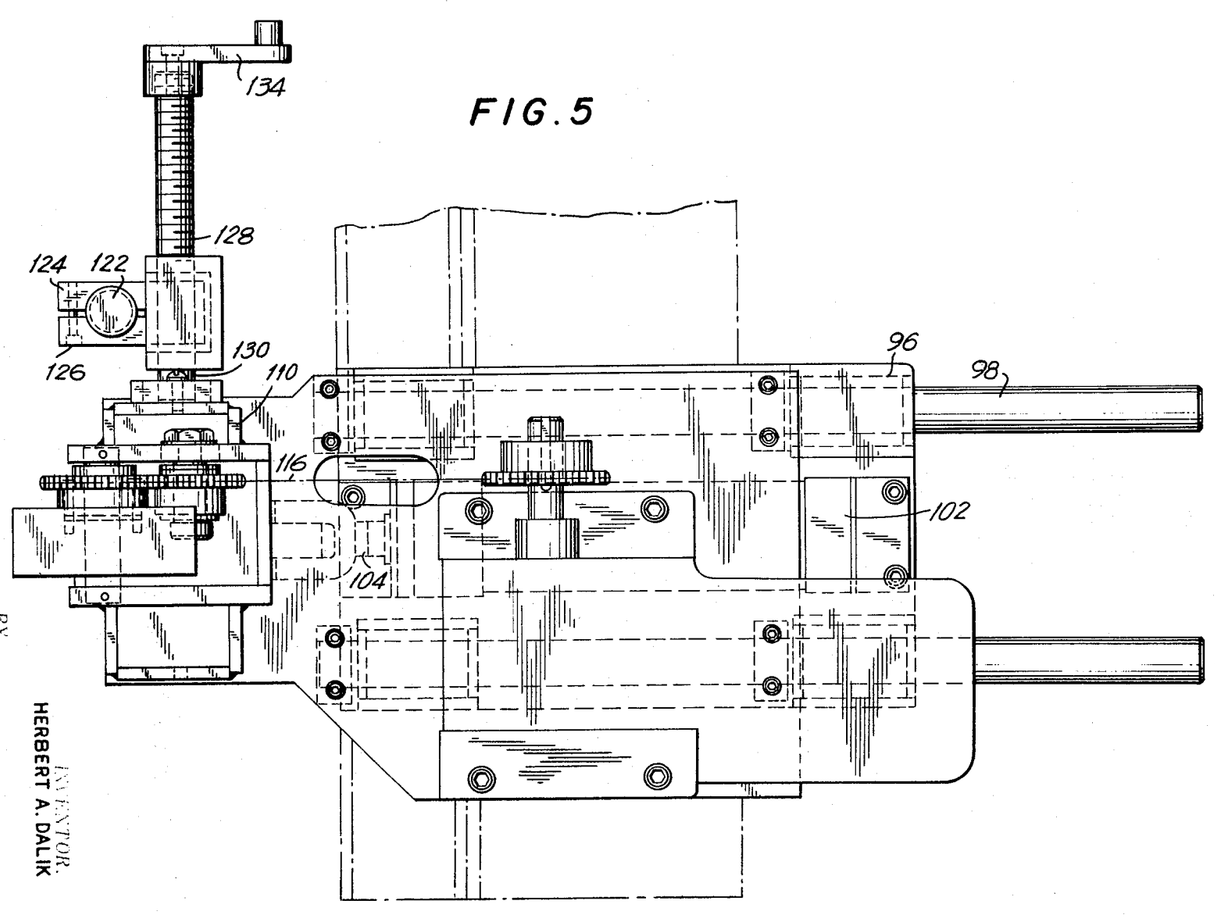
FIG. 5 is a plan view of the scribing apparatus illustrated in FIG. 4.

At the left end of station 52 and similarly at the right end of station 54, a scribing apparatus 90 is provided for striking a line on the peripheral surface of the pipe at a predetermined distance from the end 92 of spigot 80. Scribing apparatus 90 is more clearly illustrated in FIGS. 4 and 5, wherein it is seen that the apparatus is mounted on platform 94 secured to frame 14. Apparatus 90 includes a main support plate 96 which is slidably mounted on a pair of guide rods 98 by means of depending ears 100 which receive the rods. The lateral positioning of scribing mechanism 90 with respect to pipes 32 is provided by hydraulic ram 102 which is secured to platform 94 and has a piston rod 104 secured to platform 96 in order to move the latter along rods 98. A pair of pipe engaging wheels 108 are rotatably mounted on platform 96 by a support structure 110 secured thereto. Wheels 108 are driven through sprockets 112 by motor 114 and drive chain 116. Chain 116 is looped about an intermediate idler sprocket 118 so that wheels 108 are rotated in opposite directions.

When pipes 28 are positioned at the first stations 52 and 54, the ram 102 at each of these stations is operated to move platform 96 towards the pipes to engage wheels 108 therewith. It is noted that not only does the action of ram 102 cause wheels 108 to engage pipes 28 but also serves to accommodate pipes of various diameters. Thereafter, motor 114 is operated to cause rotation of wheels 108 and thus, pipe 28, so that a line may be scribed on the exterior peripheral surface thereof.

A scribing wheel 120 is rotatably mounted on a vertically extended support member 122 adjustably secured in a bifurcated clamp 124 by bolt 126. Wheel 120 is positioned by support 122 to be at substantially an intermediate position between wheels 108 to assure proper engagement with the peripheral surface of the pipes 28 when wheels 108 are moved into engagement therewith by ram 102. Clamp 124 is threadably mounted on threaded support rod 128, the latter being rotatably mounted at its end 130 in wheel support structure 110. Threaded rod 128 has handle 134 secured thereby by which the rod is adapted to be manually rotated to adjust the lateral position of wheel 120 with respect to the end of spigot 80. In this manner, the relative position of the scribed line on the spigot pipe may be varied in accordance with the diameter of the pipe being processed during a particular operation, since the depth of insertion of the spigot in the bell varies in accordance with the size of the pipe.

Figure 8:
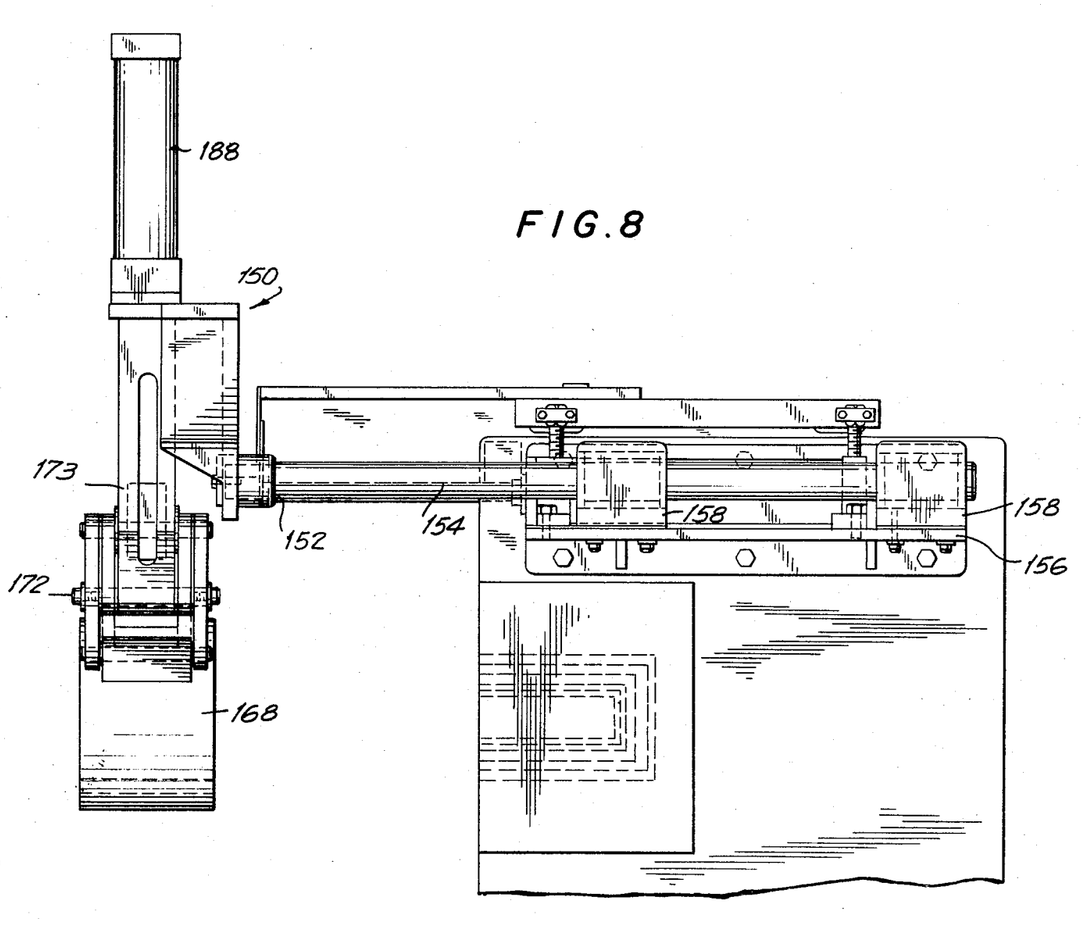
FIG. 8 is a plan view of the clamping apparatus shown in FIG. 7.

After completion of the scribing and cleanout operations plates 64 and stop members 66 are retracted by rams 102 and conveyor 12 is operated to move the pipes, in their laterally offset positions, from stations 52 and 54 to heating stations 140 and 142 respectively. As the pipes are moved to these stations, the next pair of pipes 28a and 28b to be belled are picked up by the conveyor in the manner previously described, with the second pipe 28b of the pair being picked up "on the fly," and transported to stations 52 and 54. As the heating operations are performed at stations 140 and 142, the subsequent pair of pipes are being cleaned and scribed at stations 52 and 54. At each of these stations, a heating element 144 for the wall thickened end portion 34 of pipes 28 is provided, and, as at stations 52 and 54, heating elements 144 are located at opposite ends of the apparatus in accordance with the location of the opposed wall thickened end portions of the pair of pipes. Upon reaching stations 140 and 142, conveyor 12 is stopped with the pipes in position opposite heating elements 144. Clamping apparatus 146 is provided adjacent each of the heaters 144 for respectively engaging the adjacent pipe and moving the pipe into the adjacent heating element wherein the wall thickened end portion thereof is heated in preparation for the belling operation. Clamping system 146, more clearly illustrated in FIGS. 7 and 8, includes a clamping head 150 which is rigidly secured to the ends 152 of a pair of guide shafts 154. The latter are mounted for sliding movement on support platform 156 by means of guide blocks 158. Platform 156 is a generally vertically extending member and is fixed at its base 160 on platform 162 which forms part of frame 14. Hydraulic ram 164 is also secured to platform 156 and includes a piston rod 166 secured to head 150 for moving the head and guide rods 154 with respect to the platform and heater 144.

Clamping head 150 includes a pair of jaws 168 which are pivotally mounted at their inner ends 170 on a common pivot point 172. Pivot point 172 is located on a fixed position on the frame 173 which forms the clamping head. Each of the jaws 168 is provided with an extension 174 which are pivotally connected at 176 to ends 178 of links 180. The latter have opposed end portions 182 which are pivotally secured at a common pivot point 183 in a block 184 which is mounted for sliding movement within frame 173. Block 184 is operatively connected to piston rod 186 of hydraulic ram 188 which ram is rigidly connected at its forward end 189 to frame 173. As seen in FIG. 7, when piston rod 186 is retracted by ram 188, block 184 and pivot point 183 are moved upwardly, so that jaws 168 are caused to pivot about pin 172 to their dotted line position under the influence of the movement of links 180.

When pipes 28 are presented at stations 140 and 142, clamping head 150 is in its open configuration to receive the pipes adjacent their wall thickened end portion, ram 188 is then actuated to close jaws 168 and sequentially ram 164 is actuated to pull pipe end 34 into heater 144. After the heating operation, ram 164 is again actuated to return the pipe to its previous position wherein it was laterally offset with respect to the other pipe in the pair and jaws 168 are opened by ram 188 to free the pipes for movement to the next station.

Figure 9:
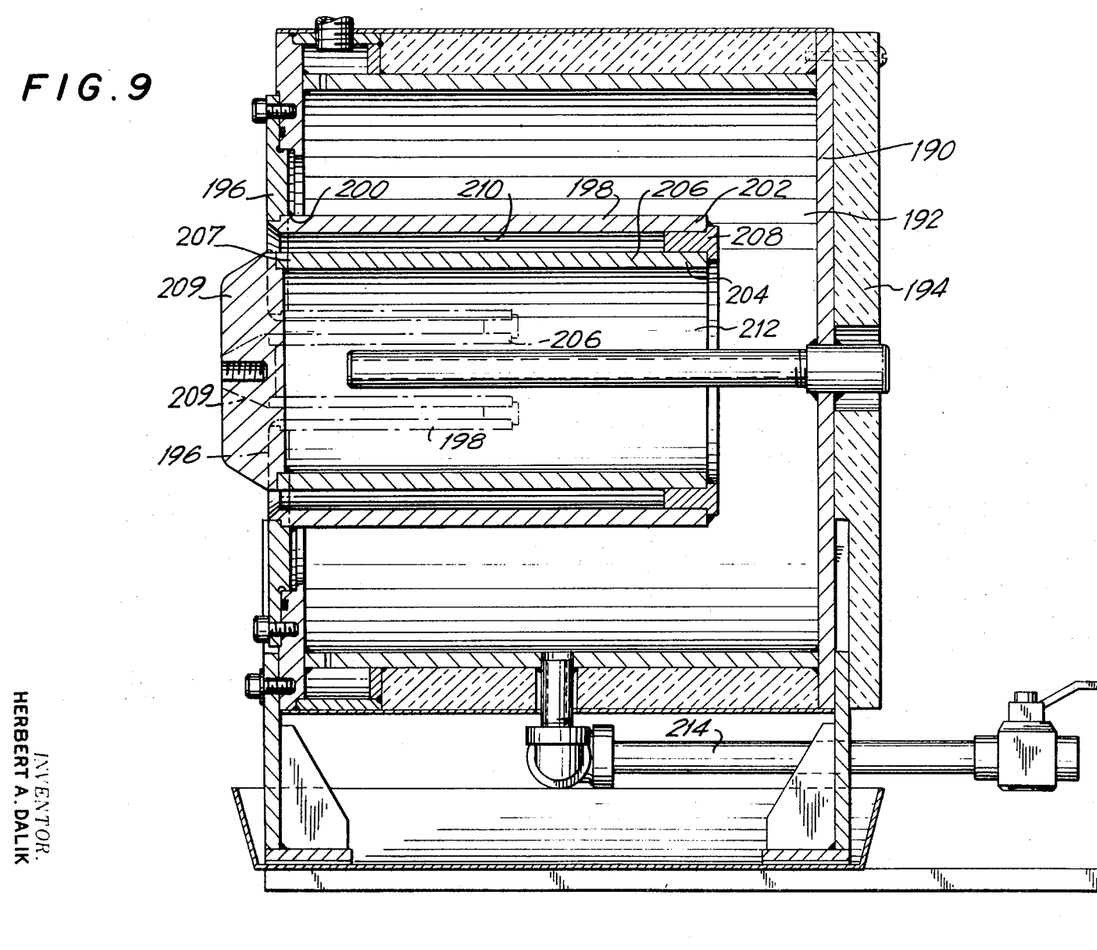
FIG. 9 is a sectional view, taken on line 9—9 of FIG. 2, of the heater for the wall thickened pipe end portions.

The specific pipe heater mechanism 144 is more clearly illustrated in FIG. 9, wherein it is seen that the heater includes a housing 190 which is adapted to contain a supply of heated oil 192. The housing is thermally insulated by plates 194 to prevent escape of heat from the oil to the atmosphere. Housing 190 includes a removable front plate 196 to which a cylindrical housing 198 is secured at its forward end 200. Rearward end 202 of housing 198 is secured to the rearward end 204 of cylindrical housing 206, the latter having a substantially smaller diameter than housing 198 and being received therein. The diameter of the housings 198 and 206 are determined so that the chamber 210 defined therebetween is adequate to receive the thickened end portion 34 of pipe 28. Ends 202 and 204 of housings 198 and 206 are secured by an annular ring 208 as, for example by welding, to prevent flow of heated oil into chamber 210 defined between the housings. The interior portion 212 of housing 206 is open to the remainder of housing 190 so that heated oil within the housing would flow therein. The forward end 207 of housing 206 is fully covered by an annular plate 209 to prevent discharge of oil from the heater.

Hot oil is supplied to chamber 190 through a conduit 214 from a source thereof (not shown). The oil is preheated to a sufficiently high temperature so that the heat transmitted through the walls of housings 198 and 206 is adequate to properly melt the wall thickened end portions 34 of pipes 28 in preparation of the belling operation.

It is noted that a variety of size housings 198 and 206 may be utilized depending upon the size of the pipe being belled during the particular operation. Accordingly, a second set of housings 198 and 206, in conjunction with correspondingly proportioned front plates 196 and 209, are illustrated in phantom in FIG. 7, for use in heating somewhat smaller diameter pipes.

After pipe ends 34 are sufficiently heated by heaters 144, clamping mechanisms 146 are operated to withdraw the pipes from their respective heaters 144, as described above, and return the pipes to the same relative positions they were in when they were removed from stations 52 and 54 to stations 140 and 142, i.e. in their laterally offset relation. From stations 140 and 142, after the heating operation is completed, pipes 28 are moved to a third pair of stations 220 and 222 wherein the heated pipe ends are belled. Each of the stations 220 and 222 include a pipe belling system 224, and, as with stations 42, 52, 140 and 142, only one pipe belling system is provided at each of the stations and the systems are located at opposite ends of the apparatus in accordance with the location of the wall thickened end portion of the pipe. The pipe belling apparatus 224 is substantially the same as that described in the Niessner et al. Pat. No. 3,205,535, and will not be described herein in detail.

Clamping mechanisms 146 are secured to platforms 225 which form part of frame 14 and correspond to platform 162. These clamping mechanisms may be exactly the same as those utilized at stations 140 and 142 and they serve to move the laterally offset pipes towards and away from their respective belling apparatus, accordingly additional detailed description thereof is also believed unnecessary.

Conveyor 12, when stopped at stations 220 and 222, accurately aligns pipes 28 so that the wall thickened pipe ends 34 thereof are accurately positioned opposite the pipe belling mandrel 225. Clamping mechanisms 146 are then operated to engage the pipes adjacent their heated wall thickened ends 34 and draw them towards the belling apparatus 224 and onto the mandrel itself. Thereafter, clamps 146 are released and the belling operation proceeds as described in the Neissner et al. patents. After the belling operation is completed, the belled end 34 of the pipe is cooled by water supplied from a source (not shown) through pipe 229 which is directed through nozzle 230 to produce a cooling spray. After the pipe end has been cooled for a predetermined period of time, the water to nozzles 230 is shut off and the pipes 28 are returned to their original positions at the stations, i.e. in their laterally offset relation, by clamping systems 146. It is contemplated, however, that in the event that it is found that pipe wrinkles are formed at the base of the pipe bell during any pipe belling operation, the clamping system 146 may be utilized to engage the pipe and retract the pipe a preset small distance away from the belling mandrel in order to remove the wrinkles, prior to the cooling operation.

After completion of the belling operation, conveyor 12 is operated to move the pipes away from the belling stations. Station 222 is at the upper extreme of support 14, and conveyor 12 moves over the uppermost pulley 16a to form the return flight 26 of the conveyor. Extensions 22 carry the pipes over the top of the apparatus, i.e. over the sprocket 16a, and as the extensions move to a generally horizontal position, they are, as seen in FIG. 2, inverted so that the pipes, seated on the upper edges 22a of the extensions as the conveyor moves along its upward flight 24, roll down onto edge 22b of the preceding extensions as the conveyor is moved downwardly along flight 26.

Apparatus 10 includes a fourth station 230, at which the pipes are returned to their relatively laterally aligned positions. As seen in the drawings, the spigot end 80 of the pipes 28b are at the left end of FIG. 1a and are positioned closer to the frame 14 than wall thickened end portions 34 of the pipes 28a. As mentioned, it is desired to align the pipes with the spigot and belled ends of adjacent pipes next to each other and a hydraulic ram 232 is provided at fourth station 230 for this purpose. Hydraulic ram 232 is mounted on frame 14 adjacent flight 26, in a position corresponding substantially to the station 220, but on the opposite side of the apparatus. As the pipes are moved down flight 26, and the conveyor is stopped when the next pair of pipes reach belling stations 220 and 222, the spigot end 80 of pipe 28b is positioned at station 230 wherein it is engaged by ram 230 and moved laterally in the apparatus into lateral alignment with pipe 28a. Thus, only alternate pipes are engaged by the ram, and these pipes are moved towards the right, as seen in FIGS. 1a and 1b until they are in generally lateral alignment with the remaining pipes. The stroke of arm 42 is adjustable so that the amount of movement provided thereby can be controlled in accordance with the size pipe being belled.

To facilitate removal of the completed pipes from the apparatus, a plurality of discharge rails 240 are secured below station 230 to frame 14 adjacent the rearward flight 26 of conveyor 12. As conveyor 12 and extensions 22 move past rail 240, pipes 28 are engaged by the rail and lifted from the extensions, so that the pipe will roll down the rail to a unitizing cart (not shown) wherein the pipes are tied together with adjacent pipes having their belled and spigot portions in contact.

It is thus seen that an automatic and continuous apparatus has been provided for belling the ends of extruded pipes. The apparatus eliminates the constant effort of an operator to move the pipes from one position to another to perform the various required processes on the pipe ends, and moreover, the apparatus is adapted to operate at the same speed as the extruder so that there is no pile-up or back-up of excess pipes due to slowness of the belling operation. Further, the dangerous operation of having to rotate the pipes 180° in the air after the belling operation in order to properly package or unitize the completed pipes is eliminated.

Although a specific embodiment of the invention has been described herein in detail, it is to be understood that the invention is not limited to that precise embodiment, and that various changes and modifications may be effected therein by one skilled in the art without departing from the scope or spirit of this invention.

What is claimed is:

1. Apparatus for simultaneously belling in a continuous process, selected ends of pairs of pipe sequentially supplied thereto, said apparatus comprising, a pick-up station, means for moving said pipes from said pick-up station to a plurality of stations in said apparatus, a pair of first process stations respectively receiving said pipes, means at said first station for cleaning both ends of said pipes, a pair of second process stations respectively receiving said pipes after movement by said moving means from said first station, means at said second stations for heating said selected pipe ends, a pair of third process stations respectively receiving said pipes after movement from said second station, means at said third stations for belling said heated selected pipe ends, and means for discharging said pipes from said moving means and said apparatus.

2. Apparatus as in claim 1 including means at said first stations for scribing a line on the periphery of said pipes at a predetermined distance from the ends thereof opposite said selected ends.

3. Apparatus as in claim 1 wherein said scribing means includes a stop member at each of said first stations and means for moving said pipes laterally of the path of travel of said moving means to engage said opposed ends respectively with said stop members and thereby position said pipes in laterally offset relation.

4. Apparatus as in claim 3 including means for moving one of said pipes laterally of the path of travel of said moving means, after said selected end is belled by said belling means, whereby said pipes are positioned on said moving means in generally lateral alignment for discharge from said apparatus.

5. Apparatus as in claim 1 wherein said cleaning means comprises means for producing a flow of air in said pipes at each end thereof, said flow being directed outwardly of said pipe ends to remove debris therein.

6. Apparatus as in claim 5 wherein said pipes are supplied thereto with the selected pipe ends located respectively at opposite ends of each pair of pipes, and each of said cleaning, heating and belling means are located respectively at opposite ends of said apparatus at their respective stations.

7. Apparatus as in claim 6 including first clamping means at each of said second stations for moving said pipes laterally of the path of travel of said moving means and into said heating means, said first clamping means returning said pipes to said offset lateral relation after heating of said selected ends by said heating means.

8. Apparatus as in claim 7 including second clamping means at each of said third stations for moving said pipes laterally of the path of travel of said moving means and into said belling means, said second clamping means returning said pipes to said offset lateral relation after belling of said selected ends by said belling means.

9. Apparatus for simultaneously belling the single wall thickened end portion of each of a pair of pipes supplied to the apparatus from an extruder with the thickened end portions thereof located at opposite ends of the respective pipes, said apparatus comprising, a pick-up station for receiving said pipes, a generally vertically extending conveyor means for sequentially receiving said pipes at said pick-up station and transporting said pipes between a plurality of process stations, a pair of generally vertically spaced first process stations, a stop member mounted at each of said first stations for engagement with the unthickened end of said pipes, means at said first stations for moving said pipes in opposite directions perpendicularly to the path of travel of said conveyor from said first to said second station whereby said pipes are located in relatively offset relation and said unthickened ends are engaged with said stop member, means at said first station for producing a flow of air in each of said pipes at each end thereof, said air flow being directed outwardly of said pipe ends to remove debris therein, a pair of generally vertically spaced second process stations, means of each of said second stations for heating the wall thickened end portions of the respective pipes at said second stations after movement of said pipes from said first to said second stations by said conveyor means, a pair of generally vertically spaced third process stations, means at each of said third stations for respectively belling the wall thickened end portions of the respective pipess at said third station after movement of said pipes from said second to said third station by said conveyor means, and a fourth station remote from said third station, means at said fourth station for moving one of said pipes into lateral alignment with the other of said pipes whereby the belled end of each pipe is in lateral alignment with the unbelled end of the other pipe and means for removing said pipe from said conveyor in laterally aligned relation after passage through said fourth station.

10. Apparatus as in claim 9 including clamping means at each of said second stations for moving said pipes laterally of said path of travel from said first to said second station whereby said wall thickened ends are inserted in the respective heating means at said second stations.

11. Apparatus as in claim 10 including second clamping means at each of said third stations for moving said pipes laterally of the path of travel of said conveyor means from said second to said third station whereby the heated wall thickened ends of said pipes are inserted in the respective belling means at said third stations.

12. Apparatus as in claim 11 including means for cooling the respective wall thickened ends after belling by said belling means.

13. Apparatus as in claim 12 wherein said conveyor includes a plurality of sets of extensions adapted to receive and carry said pipes through said stations.

14. Apparatus as in claim 13 including means on said apparatus adjacent said pick-up station for restraining movement of said pipes from said extruder to said pick-up station, said restraining means permitting passage of a pipe to said pick-up station when a set of said conveyor extensions are moved to said pick-up station.

15. Apparatus as in claim 9 wherein said means for producing a flow of air in said pipes comprises, an air nozzle slidably mounted on said apparatus adjacent each pipe end at said first station, and means for reciprocating said nozzles into and out of said pipe, said nozzles having generally rearwardly directed apertures therein and being connected to a source of pressurized air to produce said air flow, said rearwardly directed aperture directing said air flow outwardly of said pipe ends when said nozzle is inserted therein, thereby to remove debris in said ends.

16. Apparatus as in claim 9, including means at said first station for scribing a line on the periphery of said pipes at a predetermined spaced location from the unthickened ends of said pipe.

17. Apparatus as in claim 9 wherein said heating means comprises a housing defining a chamber in which said wall thickened end portion is received, said housing having wall portions adjacent said chamber and being adapted to contain heating fluid for heating said thickened end portions by convection through said wall portions.

References Cited

UNITED STATES PATENTS

| 2,695,255 | 11/1954 | Avery | 18—19 TM UX |
| 2,974,367 | 3/1961 | Doering et al. | 18—19 TM |
| 3,079,637 | 3/1963 | Marzillier | 18—19 TM |
| 3,315,308 | 4/1967 | Wiley et al. | 18—19 TM X |
| 3,360,828 | 1/1968 | Behrens | 18—4 PX |
| 3,383,750 | 5/1968 | Schroeder et al. | 18—19 TE X |
| 3,591,896 | 7/1971 | Tartaglia | 18—19 TE |

J. HOWARD FLINT, JR., Primary Examiner

U.S. Cl. X.R.

264—95, 322; 425—384, 393, 397, 455, 385